(12) United States Patent
Fujimoto et al.

(10) Patent No.: US 10,418,935 B2
(45) Date of Patent: Sep. 17, 2019

(54) APPARATUS AND METHOD FOR ANALYZING POWER GENERATION

(71) Applicants: TENSOR CONSULTING CO. LTD., Tokyo (JP); MITSUI CHEMICALS, INC., Tokyo (JP)

(72) Inventors: Koji Fujimoto, Tokyo (JP); Kazutomo Shibahara, Tokyo (JP); Tsuyoshi Shioda, Chiba (JP); Yuji Inatomi, Chiba (JP)

(73) Assignees: TENSOR CONSULTING CO. LTD., Chiyoda-Ku, Tokyo (JP); MITSUI CHEMICALS, INC., Minato-Ku, Tokyo (JP)

( * ) Notice: Subject to any disclaimer, the term of this patent is extended or adjusted under 35 U.S.C. 154(b) by 168 days.

(21) Appl. No.: 15/300,861

(22) PCT Filed: Mar. 31, 2015

(86) PCT No.: PCT/JP2015/060059
§ 371 (c)(1),
(2) Date: Sep. 30, 2016

(87) PCT Pub. No.: WO2015/152205
PCT Pub. Date: Oct. 8, 2015

(65) Prior Publication Data
US 2017/0025997 A1 Jan. 26, 2017

(30) Foreign Application Priority Data
Mar. 31, 2014 (JP) .................. 2014-072020

(51) Int. Cl.
*H02S 50/10* (2014.01)
*G06Q 50/06* (2012.01)
(Continued)

(52) U.S. Cl.
CPC ............. *H02S 50/10* (2014.12); *G06Q 50/06* (2013.01); *H02S 50/00* (2013.01); *H02J 3/00* (2013.01);
(Continued)

(58) Field of Classification Search
CPC ...................................................... H02S 50/10
See application file for complete search history.

(56) References Cited

U.S. PATENT DOCUMENTS

| 2011/0066401 | A1 | 3/2011 | Yang et al. | |
| 2011/0270546 | A1* | 11/2011 | Smith | H02S 50/10 702/60 |
| 2013/0085729 | A1 | 4/2013 | Tsuruta et al. | |

FOREIGN PATENT DOCUMENTS

| EP | 2 500 738 A1 | 9/2012 |
| JP | H08-64653 A | 3/1996 |

(Continued)

OTHER PUBLICATIONS

Extended Search Report issued by the European Patent Office in corresponding European Application No. 15772628.2 dated Aug. 1, 2017 (8 pages).

(Continued)

*Primary Examiner* — Manuel A Rivera Vargas
(74) *Attorney, Agent, or Firm* — Buchanan, Ingersoll & Rooney PC

(57) ABSTRACT

Technique is provided that enables detection of changes in the condition of a power generation system that generates fluctuating power outputs even in a normal condition thereof. A power generation system management apparatus has: range information management means for managing a condition determination power output range corresponding to a range in which a power output at a predetermined measurement point of the power generation system is to be included with a predetermined probability or higher, the (Continued)

condition determination power output range being determined based on a standard deviation of a plurality of model construction power output values, which is calculated using a representative value of the power output at the measurement point and the model construction power output values, the representative value being calculated from a pseudo system model that is created with a non-parametric method using the plurality of model construction power output values.

13 Claims, 10 Drawing Sheets

(51) Int. Cl.
    *H02S 50/00*     (2014.01)
    *H02J 3/00*     (2006.01)
    *H02J 3/38*     (2006.01)

(52) U.S. Cl.
    CPC ......... *H02J 3/383* (2013.01); *H02J 2003/007* (2013.01); *Y02E 10/563* (2013.01); *Y02E 60/76* (2013.01); *Y04S 10/60* (2013.01); *Y04S 40/22* (2013.01)

(56) References Cited

FOREIGN PATENT DOCUMENTS

| | | |
|---|---|---|
| JP | H09-56181 A | 2/1997 |
| JP | 2002-289883 A | 10/2002 |
| JP | 2007-233639 A | 9/2007 |
| JP | 2009-002651 A | 1/2009 |
| JP | 2009-099607 A | 5/2009 |
| JP | 2011-216811 A | 10/2011 |
| JP | 2011-233584 A | 11/2011 |
| JP | 2012-119632 A | 6/2012 |
| JP | 2013-073537 A | 4/2013 |
| JP | 2013-093430 A | 5/2013 |
| JP | 2013-093611 A | 5/2013 |
| JP | 2013-191672 A | 9/2013 |
| WO | WO 2013/136850 A1 | 9/2013 |

OTHER PUBLICATIONS

Notification of Reasons for Refusal issued by the Korean Intellectual Property Office in corresponding Korean Patent Application No. 10-2016-7029761 dated Apr. 14, 2017 (12 pages including partial English translation).

International Search Report (PCT/ISA/210) dated Jun. 9, 2015, by the Japanese Patent Office as the International Searching Authority for International Application No. PCT/JP2015/060059.

Written Opinion (PCT/ISA/237) dated Jun. 9, 2015, by the Japanese Patent Office as the International Searching Authority for International Application No. PCT/JP2015/060059.

* cited by examiner

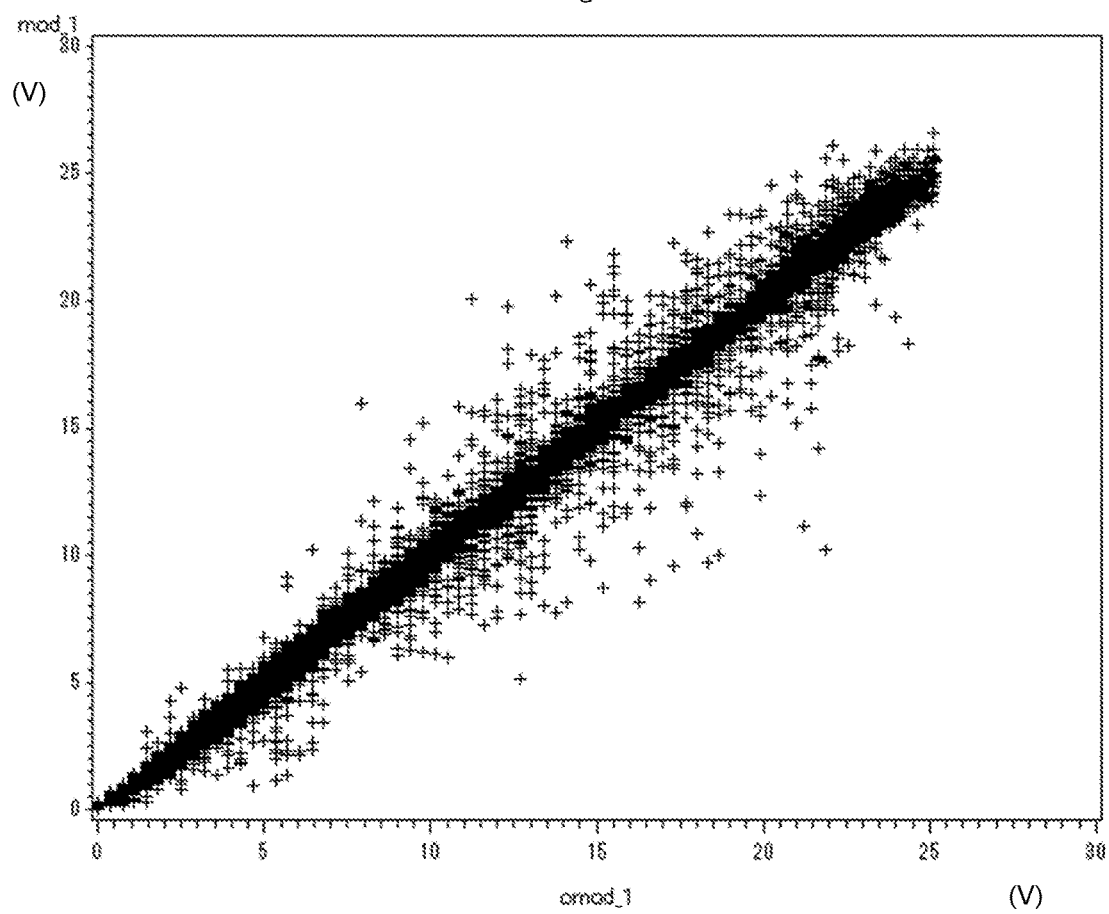

APPARATUS AND METHOD FOR ANALYZING POWER GENERATION

TECHNICAL FIELD

The present invention relates to a technique for analyzing the condition of a power generation system.

BACKGROUND ART

PTL 1 discloses a technique for facilitating maintenance of a photovoltaic apparatus. According to this technique, the output level of each of a plurality of units configuring solar panels are detected by measurement, and the units that require maintenance are detected by comparing a level value calculated by a mathematical formula with the actual measurement values.

CITATION LIST

Patent Literature

[PTL 1]
Japanese Patent Application Publication No. H9-56181

SUMMARY OF INVENTION

Technical Problem

However, a large-scale photovoltaic system such as a mega solar that uses a large number of solar panels is generally so configured that the actual measurement value of each of the individual units of the solar panels cannot be obtained. Such a system can merely obtain actual measurement values, which are outputs of strings formed by serially connecting a plurality of solar panels or inputs of a power conditioner having a plurality of strings connected in parallel, as the measurement points.

Simply attempting to synthesize the level values of the respective units calculated in PTL 1 to calculate the level values corresponding to the foregoing measurement points and then to compare the resultant level values with the actual measurement values corresponding to the measurement points, leads to a significant impact of, for instance, variations in performance of the individual solar panels onto the changes in the system caused by a deterioration or failure of the panels. In such circumstances, detection of a failure may be impossible.

An object of the present invention is to provide a technique that enables detection of changes in the condition of a power generation system that generates fluctuating power outputs even in a normal condition thereof, the changes occurring due to an age-related deterioration or failure of the power generation system.

Solution to Problem

A power generation system analyzer according to one aspect of the present invention is a power generation system analyzer for analyzing a condition of a power generation system, the power generation system analyzing having: range information management means for managing a condition determination power output range corresponding to a range in which a power output at a predetermined measurement point of the power generation system is to be included with a predetermined probability or higher, the condition determination power output range being determined based on a standard deviation of a plurality of model construction power output values, which is calculated using a representative value of the power output at the measurement point and the model construction power output values, the representative value being calculated from a pseudo system model that is created with a non-parametric method using the plurality of model construction power output values, which are being model construction power outputs at the measurement point; power output value acquisition means for acquiring the power output measured at the measurement point, as a condition determination power output value; and condition determination means for comparing a plurality of condition determination power output values with the condition determination power output range to determine the condition of the power generation system, based on a result of the comparison.

Advantageous Effects of Invention

The present invention enables detection of changes in the condition of a power generation system that generates fluctuating power outputs even in a normal condition thereof.

BRIEF DESCRIPTION OF DRAWINGS

FIG. 7C is a scatter diagram showing the relationship between a generated voltage value (horizontal axis) that is calculated by a pseudo system model receiving the input of a solar radiation amount, and an actual measurement value (vertical axis) measured by the experimental system.

DESCRIPTION OF EMBODIMENTS (First Embodiment)

Figure 1:
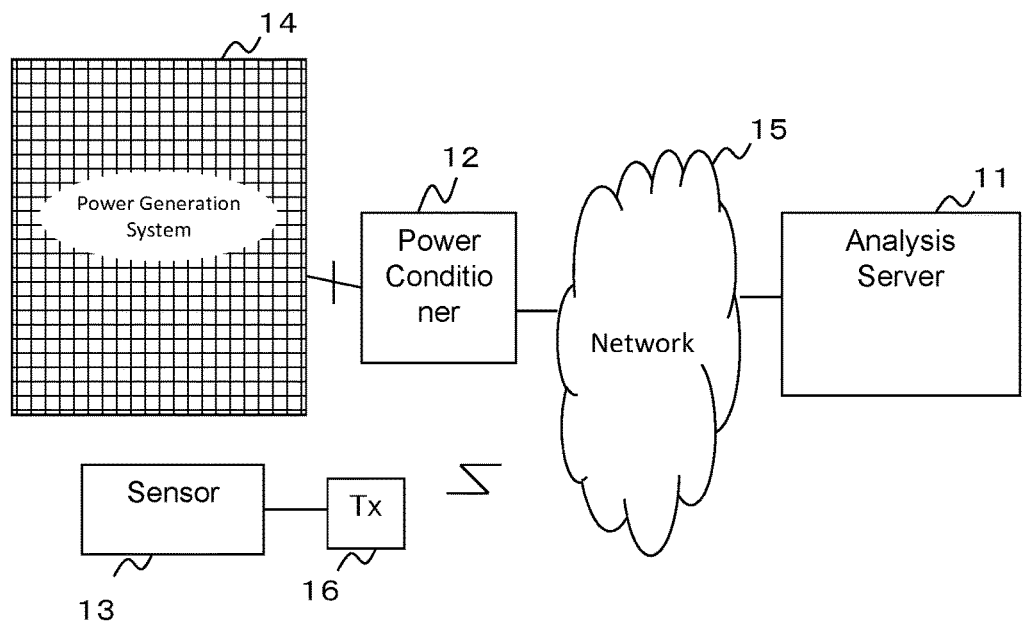
FIG. 1 is a block diagram of a power generation monitoring system according to a first embodiment.

FIG. 1 is a block diagram of a power generation monitoring system according to a first embodiment.

The power generation monitoring system is a system for monitoring the condition of a power generation system 14 by detecting its failure or deterioration, and has an analysis server 11, a power conditioner 12, and a sensor 13.

The power generation system 14 and the sensor 13 are connected to the power conditioner 12. The power conditioner 12 and the analysis server 11 are connected to a network 15 so as to be able to communicate data with each other. The network 15 is a wide area network such as the Internet.

The power generation system 14 is a device for generating power using renewable energy. In the first embodiment, the power generation system 14 is, for example, a photovoltaic system having a plurality of solar panels (not shown) connected to each other.

The analysis server 11 is a device that collects information on power outputs of the power generation system 14 measured by the power conditioner 12 and information on sensor values obtained by the sensor 13, and thereby determines the condition of the power generation system 14 based on these information. The analysis server 11 may be provided in a place far away from the power generation system 14, and a plurality of power generation systems 14 may be monitored by a single analysis server 11.

The power conditioner 12 is a device that converts generated power, which is a power output of the power generation system 14, from a direct current into an alternate current. The power conditioner 12 according to the first embodiment functions to measure a power output of the power generation system 14 and notifies the analysis server 11 of the measured power output.

The sensor 13 is any sensor that measures the power generation system 14 and the surrounding environment thereof. In the first embodiment, the sensor 13 includes a sensor that measures a solar radiation amount and outputs a measured sensor value corresponding thereto and a sensor that measures the rear-surface temperature of solar panels and outputs a sensor value corresponding thereto. The rear-surface temperature means is a temperature that is measured by a temperature sensor installed in the rear surfaces of the substantially central solar panels of the plurality of solar panels configuring the power generation system 14. The sensor values from the sensor 13 are transmitted by a wireless transmitter (Tx) 16 connected to the sensor 13, and then received by the analysis server 11 through the network 15. The sensor values are recorded in conjunction with time information in the analysis server 11.

The rear-surface temperature to be measured is an example of temperature information that has an impact on the performance of the solar panels; however, the present invention is not limited to this example. In another example, the internal temperatures of the cells configuring a solar panel may be measured. In so doing, a solar panel for measuring the internal temperatures of the cells may be provided in order to measure the internal temperatures of the cells. In yet another example, the temperature of each solar panel may be measured using thermography.

Figure 2:
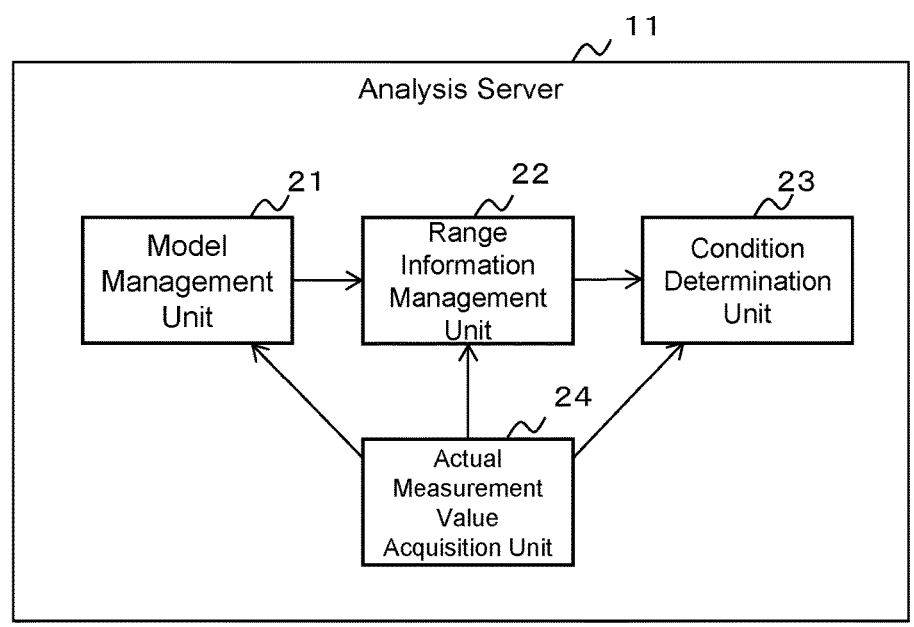
FIG. 2 is a block diagram of an analysis server 11 according to the first embodiment.

FIG. 2 is a block diagram of the analysis server 11 according to the first embodiment.

The analysis server 11 has a model management unit 21, the range information management unit 22, the condition determination unit 23, and an actual measurement value acquisition unit 24.

The range information management unit 22 determines a power output range in which the value of a power output corresponding to a measurement point of the power generation system 14 should be included with a predetermined probability or higher (condition determination power output range). In so doing, the range information management unit 22 determines the condition determination power output range based on the standard deviation of a plurality of model construction power output values.

The measurement point where a power output of the power generation system 14 is measured is, for instance, a part for measuring a composite output where the plurality of solar panels are connected in series into a plurality of strings which are then connected in parallel. This part is located between the power generation system 14 and the power conditioner 12. This measurement point is merely an example. For instance, a measurement point may be provided at the rear side of the power conditioner 12 to measure AC power.

Let it be assumed that in the first embodiment, the power output of each individual solar panel cannot be measured but a composite output of the entire power generation system 14 can be measured at one measurement point. This, too, is merely an example; thus, in another example, power outputs of a plurality of strings may be measured. In such a case, the power outputs can be monitored and analyzed string by string. In yet another example, the power output of each individual solar panel may be measured. In such a case, the power outputs can be monitored and analyzed solar panel by solar panel.

Furthermore, the model construction power output values are, for example, actual measurement values that are obtained at the measurement point when the condition of the power generation system 14 is normal, and let it be assumed that the amount of data enough to construct a model (pseudo system model) in the normal condition of the power generation system are accumulated beforehand. However, this is merely an example; thus, the model construction power output values may be non-actual measurement values, such as artificially set power output values, power output values obtained through simulations, and power output values obtained by correcting the actual measurement values of the power generation system 14 or another power generation system. In any of these cases, the model construction power output values can be input to the analysis server 11 through a recording medium or the network 15. The plurality of model construction power output values may each be a combination of an actual measurement value and a non-actual measurement value.

The standard deviation of the model construction power output values is calculated using a representative value of the power output at the measurement point and a plurality of model construction actual measurement values. The representative value is assumed as a mean value. The standard deviation can be calculated using this value and each of the model construction power output values. Specifically, the standard deviation can be obtained as follows: $\sigma = \sqrt{(\Sigma((\text{model construction power output value} - \text{representative value})^2)/\text{degree of freedom})}$. The degree of freedom here means a value dependent on the number of model construction power output values used in the calculation, i.e., the value representing the number.

In the first embodiment, the representative value of the power output at the measurement point is calculated beforehand from the pseudo system model that is created with a non-parametric method using the model construction power output values. To illustrate a simple example, a calculation method is considered in which an input value such as a solar radiation amount is divided into narrow input value bands and the power output corresponding to each of the input value bands is represented by a constant value (representative value). It should be noted in this example that the model construction power output values are added or updated as needed, to calculate a new representative value, standard deviation, and condition determination power output range each time the condition of the power generation system 14 is determined.

The condition determination power output range is determined based on the standard deviation of the plurality of model construction power output values as described above, and is, for example, a range that includes the representative value of the power output at the measurement point and has a predetermined width above and below the representative value, wherein the predetermined width is the value calculated based on the standard deviation of the model construction actual measurement values. For example, a value obtained by multiplying the standard deviation by a predetermined coefficient can be used as the predetermined width.

The condition determination power output range is a power output range in which the value of the power output at the measurement point should be included with a probability equal to or higher than a predetermined reference probability value, wherein this probability is determined by the abovementioned coefficient. For example, when the coefficient is 1.96 assuming a normal distribution of the actual measured values, the reference probability is set at approximately 95%.

In a state in which the actual measurement values fall within the condition determination power output range with a probability equal to or higher than the reference probability value, the condition of the power generation system 14 is determined to be normal. In a state in which the probability with which the actual measurement values fall within the condition determination power output range falls below the reference probability value, it means that the actual measurement values become lower or the actual measurement values begin to increasingly fluctuate significantly. In such a case, the condition of the power generation system 14 is determined as abnormal.

The model management unit 21 creates a pseudo system model beforehand with a non-parametric method using the plurality of model construction power output values, and manages this pseudo system model. This pseudo system model is used by the range information management unit 22, as described above, to calculate the representative value of the power output at the measurement point. However, this pseudo system model does not always have to be created in the analysis server 11. The pseudo system model that is created beforehand may be input to the analysis server 11 from a recording medium or through the network 15, in which case the model management unit 21 acquires and manages information on the input pseudo system model.

The actual measurement value acquisition unit 24 acquires the actual measurement values of the power output measured at the measurement point. The model construction power output values described above are measured and accumulated beforehand. Meanwhile, monitoring of the condition of the power generation system 14 begins, and the actual measurement values measured regularly for condition determination are referred to as condition determination power output values.

The condition determination unit 23 compares a plurality of condition determination power output values with the condition determination power output range, and determines the condition of the power generation system 14 based on the comparison result. The condition determination unit 23 of the first embodiment determines that the condition of the power generation system 14 is normal in a case where the condition determination power output values fall within the condition determination power output range with a probability equal to or higher than the reference probability value as described above, and determines that the condition of the power generation system 14 is abnormal in a case where the probability with which the condition determination power output values fall within the condition determination power output range falls below the reference probability value.

According to the first embodiment, the condition of the power generation system 14 is determined by comparing the plurality of condition determination power output values with the condition determination power output range that is determined from the representative value calculated from the pseudo system model using the non-parametric method and the standard deviation of the model construction power output values based on the representative value. Therefore, even if it is difficult to estimate the characteristics of the power output in the normal condition of the power generation system 14 or the actual measurement values of the power output fluctuate, changes in the condition of the power generation system 14 can be detected.

For example, the condition determination unit 23 calculates the ratio of the number of condition determination power output values included in the condition determination power output range, to the total number of condition determination power output values, and compares the calculated ratio with a predetermined reference threshold. For example, the predetermined reference threshold may be 95%, the same value used to calculate the condition determination power output range. In a case where this ratio falls below the threshold, the condition determination unit 23 determines that the condition of the power generation system 14 is abnormal (e.g., deteriorated). The condition of the power generation system 14 can be determined as abnormal when the ratio of the actual measurement values, whose difference with the representative value of the power output in the normal condition is large, is higher than that obtained when the condition of the power generation system 14 is normal. For this reason, the abnormality of the power generation system 14 can be detected even when the individual condition determination power output values or the individual model construction power output values fluctuate. The threshold for the ratio of the number of condition determination power output values falling within the condition determination power output range with respect to the total number of condition determination power output values may be (95−α(α is a margin))%.

Figure 3:
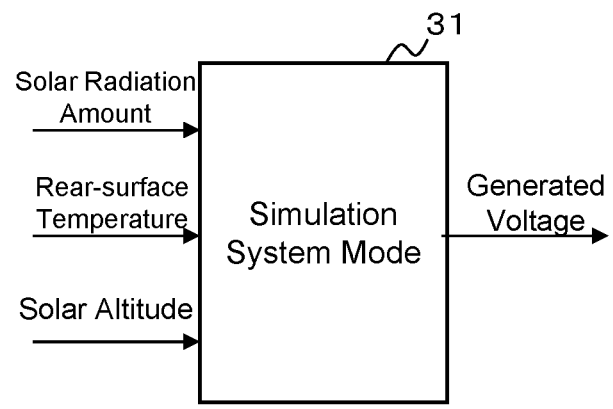
FIG. 3 is a diagram schematically showing a pseudo system model according to the first embodiment.

The pseudo system model according to the first embodiment receives, for example, the input of three parameters: the solar radiation amount and the temperature of the solar panels that are measured by the sensor 13, and a solar altitude measured at the installation location of the solar panels. The pseudo system model also outputs generated power and enables the calculation of the value of the power output at the measurement point of the photovoltaic system. The solar altitude is the angle of the sun relative to the horizon, viewed from the installation location of the solar panels. The solar altitude can be calculated based on the latitude and longitude of the installation location of the solar panels and the date/time. FIG. 3 is a diagram schematically showing the pseudo system model according to the first embodiment. As shown in FIG. 3, a pseudo system model 31 receives the input of the solar radiation amount and the temperature of the solar panels (rear-surface temperature) that are measured by the sensor and the solar altitude, calculates the power of the measurement point (generated power), and outputs the power, as described above.

The first embodiment has illustrated an example of using the condition determination power output range that is determined using all of the model construction power output values; however, the present invention is not limited to this example. In another example, of the model construction power output values, only the model construction power output values that are measured when a predetermined condition is satisfied may be used. In this case, the condition determination unit 23 may determine the condition of the power generation system 14 by using, out of the condition determination power output values acquired by the actual measurement value acquisition unit 24, only the condition determination power output values measured when the same condition is satisfied. According to this configuration, a failure of the power generation system is detected using the actual measurement values of stable power output by narrowing down the power output values used for model construction and condition determination in accordance with the predetermined condition, thereby improving the accuracy of failure detection.

The first embodiment has also illustrated an example of determining the condition of the power generation system 14 by using any of the actual measurement values acquired at random times; however, the present invention is not limited to this example. In another example, the condition determination unit 23 may determine the condition of the power generation system 14 by using power output values that are obtained at predetermined times before and after the time when fluctuations of the inputs exceed the predetermined threshold. According to this configuration, in a case where the responsiveness of the output changes relative to the fluctuations of the inputs due to a conditional change in, for instance, failure or deterioration of the power generation system 14, the accuracy of detecting a change in the condition of the power generation system 14 can be improved by determining the condition of the power generation system 14 by using the power output values obtained before and after the input fluctuations. Note that when detecting the time at which the input fluctuations exceed the predetermined threshold, the condition determination unit 23 chronologically lists a plurality of sensor values by measurement times, calculates a change in sensor values (fluctuation) with respect to time, and detects the abovementioned time based on the fact that the value of the calculated fluctuation exceeds the threshold.

This configuration is described hereinafter in more detail.

Figure 4:
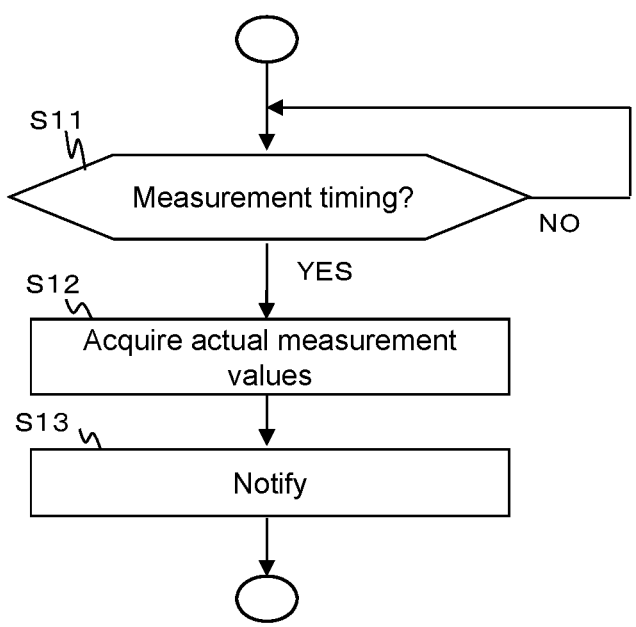
FIG. 4 is a flowchart showing an example of an operation of a power conditioner 12.

FIG. 4 is a flowchart showing an example of an operation of the power conditioner 12.

The power conditioner 12 waits for a predetermined measurement timing (step S11). When the measurement timing comes, the power conditioner 12 acquires the actual measurement values of the power output of the power generation system 14 (step S12). The power conditioner 12 sends the acquired actual measurement values of the power output to the analysis server 11 (step S13). The actual measurement value acquisition unit 24 of the analysis server 11 receives the actual measurement values of the power output sent from the power conditioner 12, and the received actual measurement values are associated with time information and stored in a memory. The measurement timing is not particularly limited and may be, for example, a regular time interval.

The actual measurement values that are measured when the condition of the power generation system 14 is normal can be utilized as the model construction power output values. The actual measurement values that are acquired after monitoring of the condition of the power generation system 14 is started are the condition determination power output values.

Figure 5:
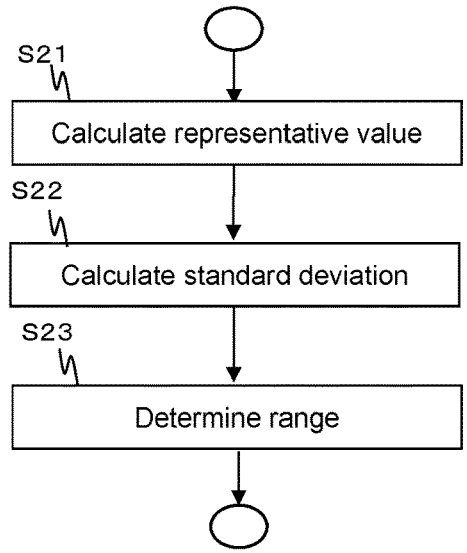
FIG. 5 is a flowchart showing an example of a process performed by a range information management unit 22 of the analysis server 11 according to the first embodiment.

FIG. 5 is a flowchart showing an example of a process performed by the range information management unit 22 of the analysis server 11 according to the first embodiment. As shown in FIG. 5, the range information management unit 22 uses the plurality of model construction power output values and the pseudo system model managed by the model management unit 21, to calculate the representative value of the model construction power output values corresponding to each input value (step S11). Next, assuming the representative value as a mean value, the range information management unit 22 obtains the standard deviation of the model construction power output values (step S12). Then, based on the standard deviation of the model construction power output values, the range information management unit 22 calculates the width of the actual measurement values within which the actual measurement values fall with a probability equal to or higher than a predetermined probability (95%, in this case (standard deviation×1.96 in a normal distribution)), the width being treated as the condition determination power output range and recorded in the memory (step S13).

Figure 6:
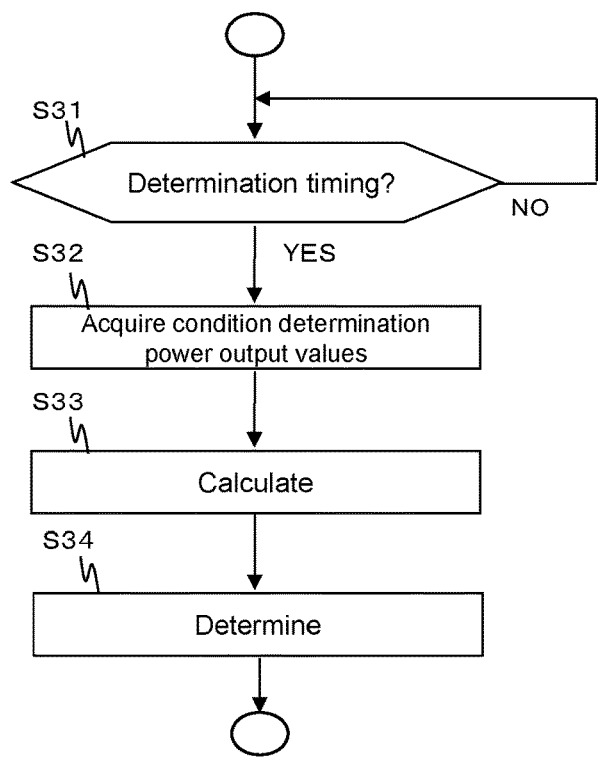
FIG. 6 is a flowchart showing an example of a process performed by a condition determination unit 23 of the analysis server 11 according to the first embodiment.

FIG. 6 is a flowchart showing an example of a process performed by the condition determination unit 23 of the analysis server 11 according to the first embodiment. As shown in FIG. 6, the condition determination unit 23 waits for a predetermined determination timing (step S31). When the predetermined determination timing comes, the condition determination unit 23 acquires, from the plurality of condition determination power output values that are stored in the memory by the actual measurement value acquisition unit 24, previous condition determination power output values that are measured during the time period between the current time and the time a predetermined time period prior to the current time, and the time information corresponding to the sensor values (solar radiation amount and rear-surface temperature) and time of acquisition that are associated with these previous condition determination power output values (step S32).

Subsequently, the condition determination unit 23 calculates the absolute value of the difference between each of the condition determination power output values and the representative value that is obtained as a result of inputting, to the pseudo system model, the solar radiation amount and rear-surface temperature obtained when each of these power output values are measured and the solar altitude calculated from the time of acquisition. The condition determination unit 23 also sequentially determines whether the absolute values of the differences are greater than the value of the predetermined width kept as the condition determination power output range. In so doing, the condition determination unit keeps beforehand the information on the installation location of the solar panels of the power generation system 14 and calculates the solar altitude based on the latitude and longitude of the installation location and the time of acquisition.

Once the determination on all the condition determination power output values is finished, the condition determination unit 23 calculates the ratio of the condition determination power output values in which the absolute values of the differences are smaller than the value of the width of the condition determination power output range, i.e., the ratio in which the condition determination power output values fall within the condition determination power output range (step S33).

In addition, the condition determination unit 23 determines whether the calculated ratio is equal to or greater than the reference probability value ((95−α)%, in this case) (step S34). In a case where the value of the calculated ratio is equal to or greater than the reference probability value, the condition of the power generation system 14 is determined as normal. However, in a case where the value of the calculated ratio is equal to or lower than the reference probability value, the condition of the power generation system 14 is determined as abnormal.

Note that the first embodiment employs the condition determination method of calculating the ratio of the number of condition determination power output values included in the condition determination power output range, to the total number of condition determination power output values, and comparing the calculated ratio with the reference threshold. However, this is merely an example, and the present invention is not limited thereto. In another example, the condition determination unit 23 may obtain the representative value of the plurality of acquired condition determination power output values and determine that the condition of the power generation system 14 is normal if the representative value falls within the condition determination power output range and abnormal if it does not.

In addition, the first embodiment has illustrated an example in which the pseudo system model receives the input of the solar radiation amount, the rear-surface temperature of the solar panels, and the solar altitude; however, the present invention is not limited to this example. In another example, a pseudo system model that receives the input of the solar radiation amount and the rear-surface temperature of the solar panels or a pseudo system model that only receives the input of the solar radiation amount can be applied to the present invention.

Figure 7A:
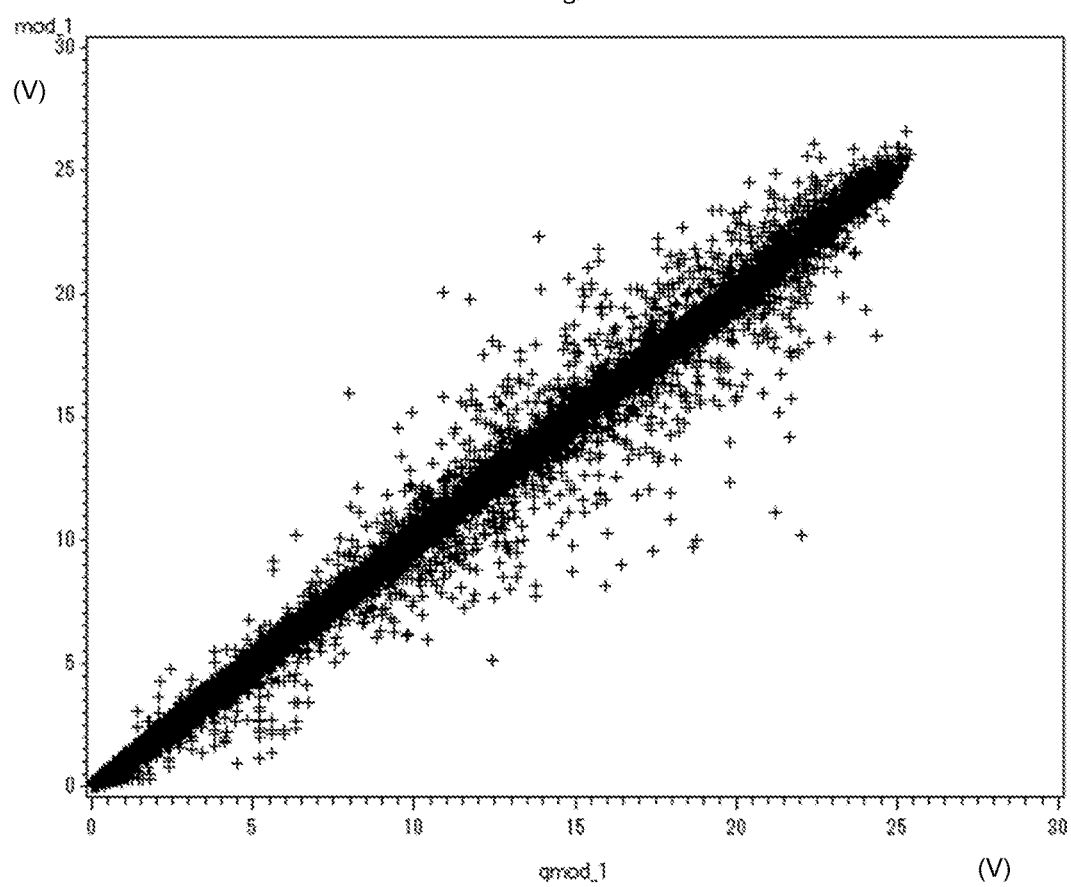
FIG. 7A is a scatter diagram showing the relationship between a generated voltage value (horizontal axis) that is calculated by a pseudo system model receiving the input of a solar radiation amount, a rear-surface temperature, and a solar altitude, and an actual measurement value (vertical axis) measured by an experimental system.
Figure 7B:
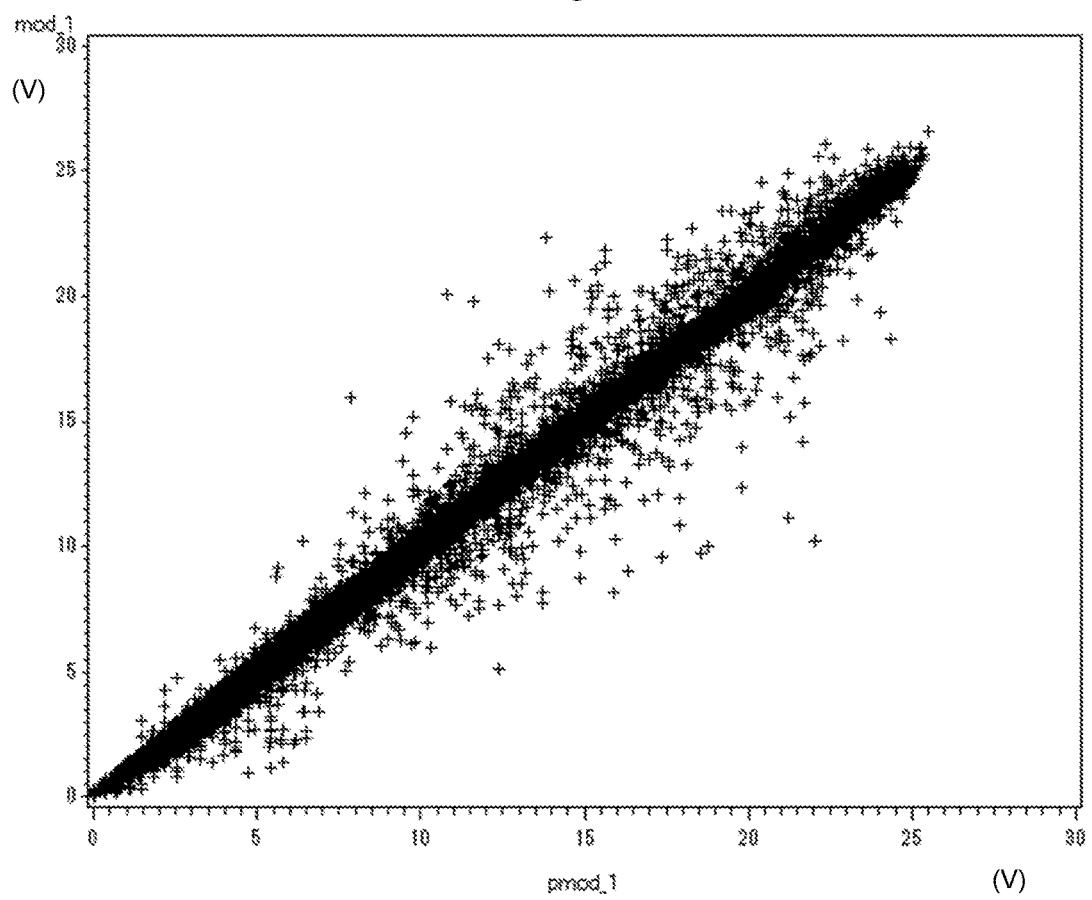
FIG. 7B is a scatter diagram showing the relationship between a generated voltage value (horizontal axis) that is calculated by a pseudo system model receiving the input of a solar radiation amount and a rear-surface temperature, and an actual measurement value (vertical axis) measured by the experimental system.

FIG. 7A is a scatter diagram showing the relationship between a generated voltage value (horizontal axis) that is calculated by the pseudo system model receiving the input of a solar radiation amount, a rear-surface temperature, and a solar altitude, and an actual measurement value (vertical axis) measured by an experimental system. FIG. 7B is a scatter diagram showing the relationship between a generated voltage value (horizontal axis) that is calculated by a pseudo system model receiving the input of a solar radiation amount and a rear-surface temperature, and an actual measurement value (vertical axis) measured by the experimental system. FIG. 7C is a scatter diagram showing the relationship between a generated voltage value (horizontal axis) that is calculated by a pseudo system model receiving the input of a solar radiation amount, and an actual measurement value (vertical axis) measured by the experimental system. In FIGS. 7A to 7C, as an actual measurement of a generated power, a generated voltage is measured in place of the generated power in a certain experimental system having constant current.

Figure 8A:
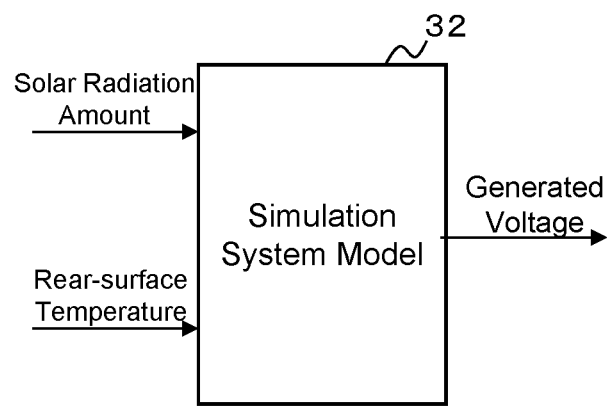
FIG. 8A is a diagram schematically showing the pseudo system model that receives the input of a solar radiation amount and a rear-surface temperature.
Figure 8B:
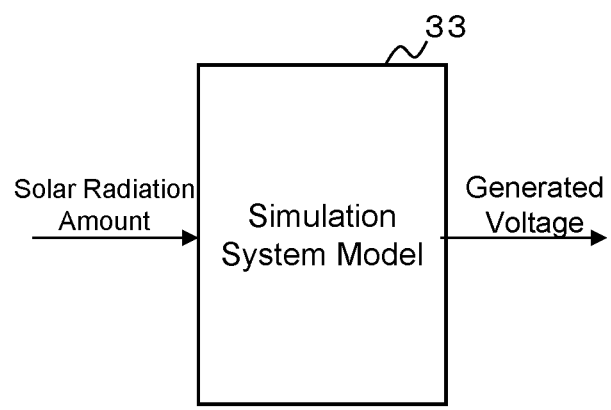
FIG. 8B is a diagram schematically showing the pseudo system model that receives the input of a solar radiation amount.

FIG. 8A is a diagram schematically showing the pseudo system model that receives the input of a solar radiation amount and a rear-surface temperature. FIG. 8B is a diagram schematically showing the pseudo system model that receives the input of a solar radiation amount.

FIGS. 7A to 7C each show a linear relationship between the generated voltage values calculated from the model and the actual measurement values. This fact implies that each of the pseudo system models can simulate the actual power generation system 14 well to calculate the representative value that well matches the actual measurement values. Thus, any of the pseudo system models shown in FIGS. 3, 8A and 8B can be applied to the present invention.

However, compared to the pseudo system model shown in FIG. 7C that only receives the input of a solar radiation amount, the pseudo system model shown in FIG. 7B that receives the input of a solar radiation amount and a rear-surface temperature shows less scattering. Furthermore, compared to the pseudo system model shown in FIG. 7B that receives a solar radiation amount and a rear-surface temperature, the pseudo system model shown in FIG. 7A that receives the input of a solar radiation amount, a rear-surface temperature and a solar altitude shows smaller scattering. This means that the power generation system 14 can be simulated with greater accuracy by imputing a solar radiation amount and a rear-surface temperature as opposed to inputting only a solar radiation amount, and by inputting a solar radiation amount, a rear-surface temperature and a solar altitude as opposed to inputting a solar radiation amount and a rear-surface temperature. Which one of the pseudo system models should be applied may be determined in view of the required accuracy and complexity of the calculation.

Note that FIGS. 7A to 7C each show the linearity of the generated voltage values (horizontal axis) calculated by the corresponding pseudo system model and of the actual measurement values (vertical axis) measured by the corresponding experimental system, and the relative relationship among the scatterings shown in FIGS. 7A to 7C. FIGS. 7A to 7C also show the data acquired by using a single crystalline solar panel with a 5Ω load resistance without considering weather-related limitations.

In addition, according to the first embodiment, the range information management unit 22 keeps the width of generated power corresponding to the differences between the actual measurement values and the relative value, as the condition determination power output range, and the condition determination unit 23 compares this condition determination power output range with the absolute value of the difference between each actual measurement value and the representative value.

In the first embodiment, an actual measurement value of a generated power moved to higher and an actual measurement value of the generated power moved to lower are treated the same way. However, the present invention is not limited to this example. In another example, in a case where the ratio of the condition determination power output values where ((representative value)−(condition determination power output value))≥(condition determination power output range (width)) is established, it may be determined that the condition of the power generation system 14 is abnormal. This example focuses on the fact that generated power drops when the condition of the power generation system 14 is abnormal, determining that the condition of the power generation system 14 is abnormal as a result of the decrease of the generated power.

In addition, two condition determination power output ranges may be defined: a first condition determination power range for determining a failure and a second condition determination power output range for determining deterioration. These two condition determination power output ranges may be used to detect a failure and deterioration. In such a case, first condition determination power output range (width)>second condition determination power output range (width) may be set. Also in such a case, a failure may be determined using the absolute value under the condition that |(representative value)−(condition determination power output value)|≥(condition determination power output range (width)) is established or not, and deterioration may be determined under the condition that ((representative value)−(condition determination power output value))≥(second condition determination power output range (width)) is established or not. This process takes into consideration that the power output drops when solar panels break down and that not only is the power output likely to drop when solar panels deteriorate but also fluctuate significantly.

In another example, the range information management unit 22 may keep beforehand a range of generated power as the condition determination range for each combination of the solar radiation amount and solar panel temperature measured at the same time as when the actual measurement values are obtained and the solar altitude measured when the actual measurement values are obtained, the generated power being determined with respect to each combination, and then determine whether the condition determination power output values fall within the condition determination power output range or not based on the solar radiation amount and solar panel temperature measured by the sensor 13 when the condition determination power output values are measured by the power conditioner 12 and the solar altitude obtained when the condition determination power output values are measured.

In yet another example, the range information management unit may calculate, each time when determining a condition determination actual measurement value, a range of generated power as the condition determination range, the generated power being determined with respect to a combination of the solar radiation amount and solar panel temperature measured at the same time as when the actual measurement values are obtained and the solar altitude measured when the actual measurement values are obtained, and then determine whether the condition determination power output values fall within the condition determination power output range or not based on the solar radiation amount and solar panel temperature measured by the sensor 13 and the solar altitude obtained when the condition determination power output values are measured.

In the first embodiment, in step S34 shown in FIG. 6 the condition determination unit 23 determines whether the calculated ratio is equal to or greater than the predetermined reference probability value. In a case where the condition determination unit 23 determines once that the value of the calculated ratio is equal to or lower than the reference probability value, the condition of the power generation system 14 is determined as abnormal. However, the present invention is not limited to this example. In another example, in step S34, in a case where the condition determination unit determines, N times consecutively, that the value of the calculated ratio is equal to or lower than the reference probability value, the condition of the power generation system 14 may be determined as abnormal.

Moreover, the first embodiment has illustrated an example in which the sensor 13 is connected to the wireless transmitter and the sensor values are transmitted from the wireless transmitter 16 to the analysis server 11 through the network 15, as shown in FIG. 1. However, the present invention is not limited to this example. In another example, the sensor 13 may be connected to the power conditioner 12 and the sensor values may be transmitted from the power conditioner 12 to the analysis server 11 through the network 15. In addition, a sensor network may be configured with a plurality of sensors and the sensor values may be transmitted from the gateway of the sensor network to the analysis server 11 through the network 15.

The first embodiment has also illustrated an example in which the analysis server 11 receives the power output generated by the power generation system 14 and the sensor values obtained by the sensor 13 from the network 15 and performs the calculation using these values; however, the present invention is not limited to this example. The power generation system and the sensor 13 do not have to be connected to the analysis server 11, and data on the power output generated by the power generation system 14 and the sensor values obtained by the sensor 13 may be accumulated in a storage device and input to the analysis server 11 using a random method, to perform the calculation.

(Second Embodiment)

In the first embodiment, the condition of the power generation system 14 is determined without taking into consideration the weather of the location where the solar panels are installed. The second embodiment, on the other hand, illustrates an example of using weather information to determine the condition of the power generation system 14. In the second embodiment, the condition of the power generation system 14 is determined only using the power output values that are measured at times that satisfy a condition under which the operation of the power generation system 14 can be determined as stable (stable condition), and the weather information is used to determine whether the stable condition is satisfied or not. Specifically, the condition of the power generation system 14 is determined only using the power output that is measured when the stable condition indicates that the weather is "cloudy."

Figure 9:
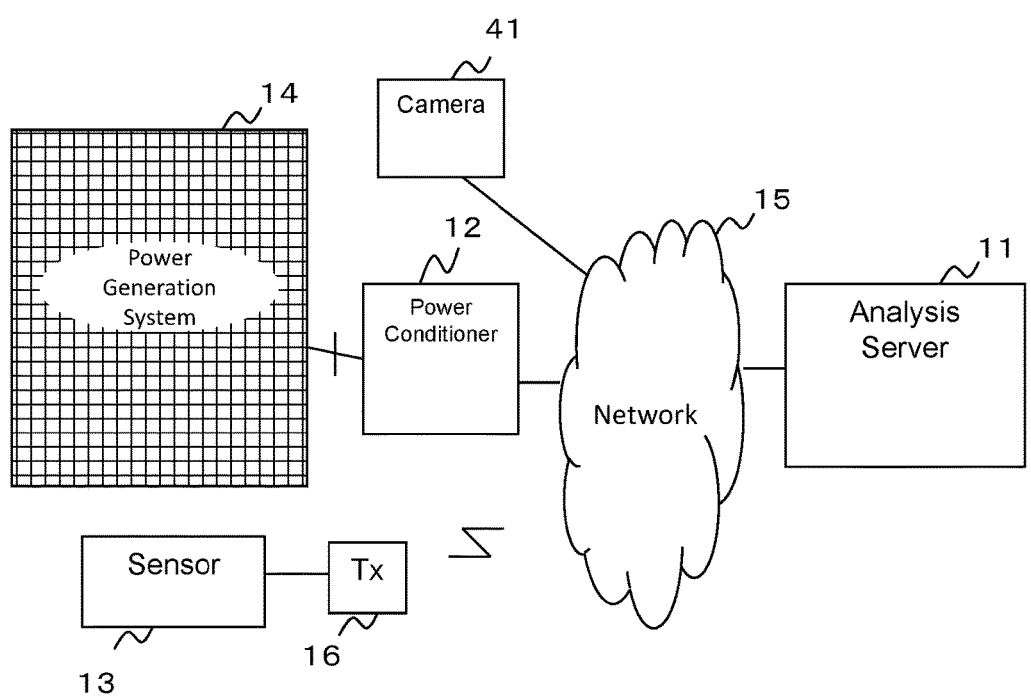
FIG. 9 is a block diagram showing a power generation monitoring system according to a second embodiment.

FIG. 9 is a block diagram showing a power generation monitoring system according to the second embodiment. The power generation monitoring system according to the second embodiment has a camera 41 in addition to the configuration shown in FIG. 1. The camera 41 has a communication function in addition to a function of capturing an aerial image. The camera 41 is connected to the network 15, and an image taken from above the power generation system 14 is transmitted along with a photographing time, to the analysis server 11 through the network 15.

Figure 10:
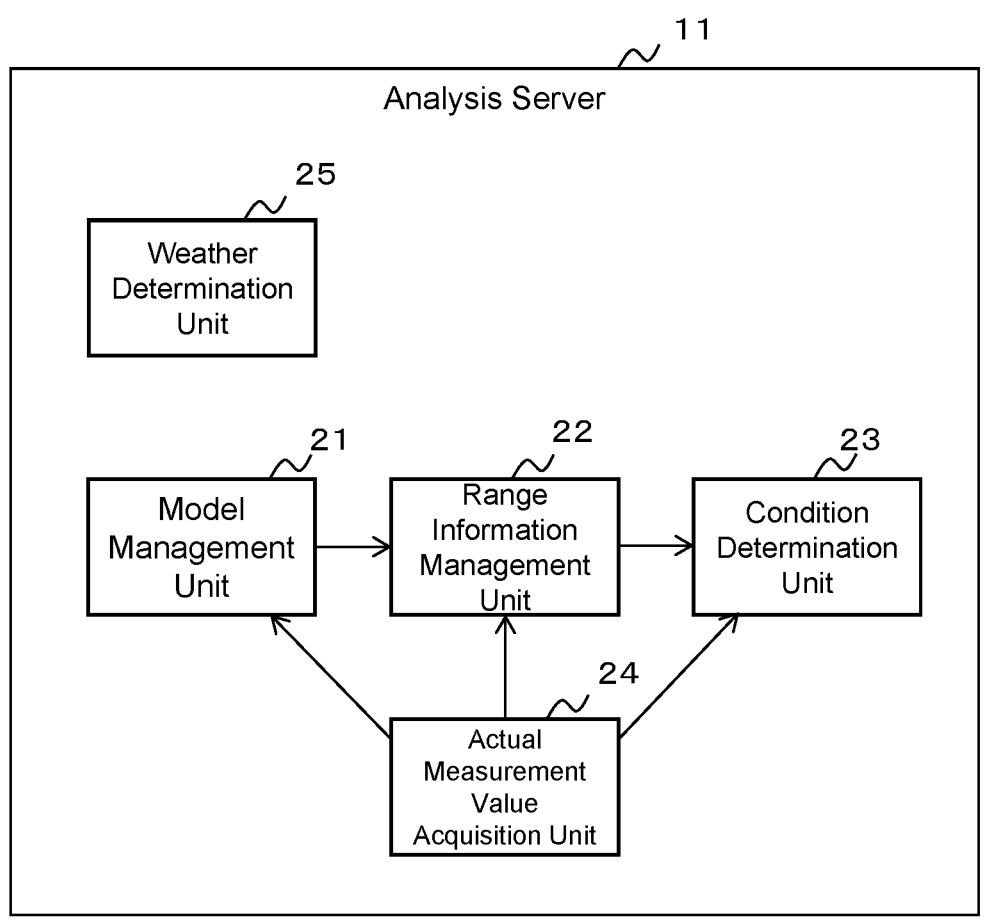
FIG. 10 is a block diagram showing the analysis server 11 according to the second embodiment.

Also in the second embodiment, part of the configuration and operation of the analysis server 11 is different from that described in the first embodiment. FIG. 10 is a block diagram of the analysis server 11 according to the second embodiment. As shown in FIG. 10, the analysis server 11 according to the second embodiment has a weather determination unit 25 in addition to the model management unit 21, the range information management unit 22, the condition determination unit 23, and the actual measurement value acquisition unit 24.

The weather determination unit 25 receives an image taken from above the power generation system 14 and information on a photographing time from the camera 41, determines the weather of the air above the power generation system 14 based on the image, and records the determined weather along with the information on the photographing time. As a result, weather information for each time is created.

For example, the weather determination unit 25 does not determine the types of weather such as clear weather and rainy weather but only determines whether the weather is cloudy or not. The weather determination unit 25 creates information on time when the weather is cloudy (cloudy time) (cloudy time information) by showing the determination result using a flag indicating cloudy weather and then adding the flag to the photographing time.

A method for determining whether the weather is cloudy or not can determine, for example, that the weather is cloudy when the ratio of the area of the region occupied by clouds to the entire aerial image captured by the camera 41 is equal to or greater than a predetermined percentage (e.g., 70%). The cloudy portion in the image can be identified with such conditions as the hue, brightness, and saturation. In another example, whether the weather is cloudy or not can be determined on the condition that the average brightness of the aerial image captured by the camera 41 is equal to or lower than a predetermined value. In yet another example, whether the weather is cloudy or not can be determined on the condition that the standard deviation of the brightness of a plurality of points in the aerial image captured by the camera 41 is equal to or lower than a predetermined value.

The model management unit 21 acquires the cloudy time from the cloudy time information, and selects and uses only the model construction power output values measured at the cloudy time, to create a pseudo system model beforehand. The method for creating the pseudo system model is the same as that described in the first embodiment that uses a non-parametric method.

The range information management unit 22 acquires the cloudy time from the cloudy time information, uses only the model construction power output values measured at the cloudy time, to determine the condition determination power output range. The method for determining the condition determination power output range is the same as that described in the first embodiment.

The condition determination unit 23 acquires the cloudy time from the cloudy time information, uses only the condition determination power output values measured at the cloudy time, to determine the condition of the power generation system 14. The condition determination method is the same as that described in the first embodiment.

As described above, according to the power generation monitoring system according to the second embodiment, the condition of the power generation system 14 is determined using the power output values that are obtained in cloudy weather in which the power output is stable and a system failure or the like has a significant impact on the power output. Therefore, the accuracy of condition determination such as detection of a failure of a solar panel can be improved.

Note that in the second embodiment, the weather determination unit 25 of the analysis server 11 determines whether the weather is cloudy or not, from the aerial image of the location where the power generation system 14 is installed; however, the present invention is not limited to this example. In another example, whether the weather is cloudy or not may be determined based on climate information provided by government, local public organizations or the like. In this case, the camera 41 is not necessary. The weather determination unit 25 of the analysis server 11 may determine whether the weather of the location where the solar panels of the power generation system 14 are installed is cloudy or not based on the climate information.

In addition, the second embodiment has illustrated an example in which the fact that the weather is cloudy is used as the stable condition; however, the present invention is not limited to this example. In another example, the fact that the quantity of light that is observed in the location where the power generation system 14 is installed is equal to or lower than a predetermined value may be used as the stable condition. In this case, in place of the camera 41, a light-quantity measuring unit may be installed in the location where the power generation system 14 is installed, and then the measurement values may be sent to the analysis server 11, so that the analysis server 11 can determine whether the weather is cloudy or not based on the sent measurement values.

(Third Embodiment)

The first embodiment has illustrated an example in which a pseudo system model is created beforehand based on the assumption that the actual measurement values as the model construction power output values that are enough to create an effective pseudo system model for simulating the power generation system 14 are already accumulated. The third embodiment, on the other hand, illustrates an example of assuming an initial state where the actual measurement values enough to create a pseudo system model for simulating the power generation system 14 well are not yet obtained, and correcting and using a pseudo system model of another system similar to the power generation system 14. The third embodiment enables the initiation of monitoring the condition of the power generation system 14 even in the initial state where the effective pseudo system model cannot be constructed.

The basic configuration of a power generation monitoring system according to the third embodiment is the same as the one shown in FIG. 1. The basic configuration of the analysis server 11 according to the third embodiment is also the same as the one shown in FIG. 2. However, the model management unit 21 of the third embodiment has a function of correcting a pseudo system model in addition to the function of the model management unit 21 of the first embodiment. This function is utilized in the initial state where the effective pseudo system model is not yet created.

The model management unit 21 of the third embodiment performs, on a pseudo system model of another power generation system different from the power generation system 14 to be monitored, correction concerning the difference in the installation location and/or installation angle between the solar panels of the power generation system 14 to be monitored and the solar panels of the latter power generation system, to create a corrected pseudo system model, and keeps the corrected pseudo system model. In this case, the range information management unit 22 uses the corrected pseudo system model to determine the condition determination power output range.

For example, the solar altitudes corresponding to the measurement times change depending on the difference in position. When calculating the solar altitude from a time and using the resultant solar altitude, the model management unit corrects the solar altitude calculated from the time, by the difference in the installation location of the solar panels.

Moreover, for example, the incidence angle of the sunlight with respect to the solar panels changes depending on the difference in the installation angle of the solar panels. In this case, the model management unit 21 corrects the solar altitude relative to solar panels in accordance with the installation angle of the solar panels. The installation angle of the solar panels mentioned here includes the direction and angle of tilting the solar panels. For example, in some cases the solar panels are installed at an angle of 10 degrees facing south.

The model management unit 21 of the third embodiment performs, on a pseudo system model of another power generation system 14 different from the power generation system 14 to be monitored, correction concerning the number of solar panels and/or the connective configuration thereof in the power generation system 14 to be monitored and the latter power generation system, to create and keep the resultant corrected pseudo system model.

For example, in a case where the power generation system 14 has a plurality of solar panels connected in series, when the number of solar panels connected in series varies, the representative value of the power output of the power generation system 14 changes in proportion to the number of solar panels. Therefore, the correction may be made based on it. As to the standard deviation, data of the power outputs of the previous power generations systems with various configurations are accumulated in conjunction with the configurations, and then changes in the standard deviation with respect to the changes in the number of serially connected solar panels are calculated based on the data. Then, the correction is made based on the result of the calculation.

For example, in a case where a plurality of strings with a plurality of serially connected solar panels are connected in parallel in the power generation system 14, data of the power outputs of the previous power generation systems with various configurations are accumulated in conjunction with the configurations, then changes in the standard deviation with respect to the changes in the number of parallel-connected strings are calculated, and then the correction is made based on the result of the calculation.

The model management unit 21 of the third embodiment performs, on the pseudo system model of another power generation system different from the power generation system 14 to be monitored, correction concerning the difference between the time period for which the power generation system 14 to be monitored is used and the time period for which the latter power generation system is used (difference in degree of age-related degradation), to create and keep the resultant corrected pseudo system model.

For example, data of power outputs of the previous various power generation systems are accumulated in conjunction with the time periods for which these power generation systems are used, changes in the standard deviation with the passage of time are calculated based on the data, and the correction is made based on the result of the calculation.

The correction concerning the difference in the installation location and/or installation angle between the solar panels, the correction concerning the number of solar panels and/or the connective configuration thereof, and the correction concerning the difference between the time periods for which the power generation systems are used may each be applied independently or the plurality of these corrections may be applied together.

(Fourth Embodiment)

In the first embodiment, the model construction power output values and the condition determination power output values are separated from each other; however, they may not be separated from each other. The actual measurement values measured when the condition of the power generation system 14 is normal should be used as the model construction power output values. This is so that a pseudo system model for simulating the power generation system 14 in its normal condition can be constructed using the actual measurement values in the normal condition. However, in some ceases the model construction power output values and the condition determination power output values are not separated clearly. For example, in some cases actual measurement value data corresponding to continuous time are accumulated but there do not exist the information indicating whether the condition of the power generation system 14 is normal or not up until a certain time. The fourth embodiment enables monitoring of the condition of the power generation system 14 even if the model construction power output values and the condition determination power output values are not separated.

Figure 11:
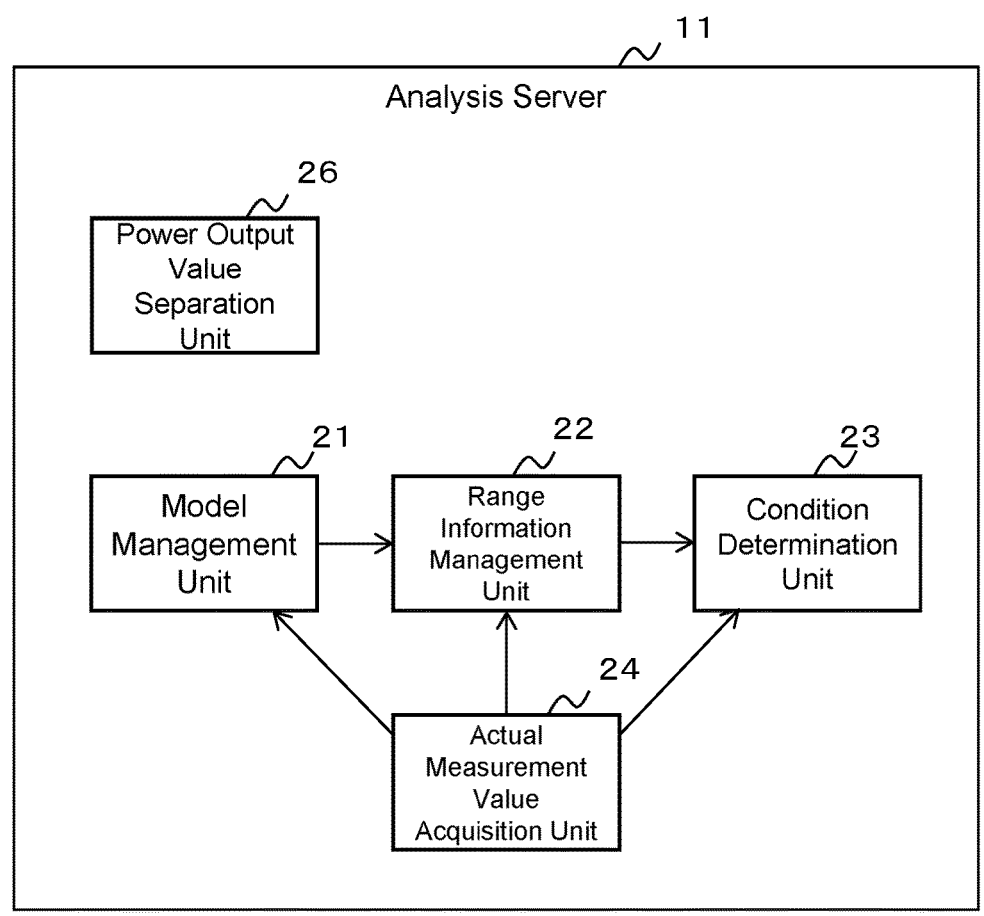
FIG. 11 is a block diagram of the analysis server 11 according to a fourth embodiment.

FIG. 11 is a block diagram of the analysis server 11 according to the fourth embodiment. The analysis server 11 of the fourth embodiment has a power output value separation unit 26 in addition to the configuration shown in FIG. 1.

A plurality of actual measurement values measured at the measurement point of the power generation system 14 are provided to the power output value separation unit 26. The power output value separation unit 26 separates these actual measurement values into the actual measurement values measured prior to a predetermined boundary time and the actual measurement values measured after the boundary time.

The model management unit 21, the range information management unit 22, and the condition determination unit 23 are the same as those of the first embodiment and execute processes using the actual measurement values measured prior to the boundary time as the model construction power output values and the actual measurement values measured after the boundary time as the condition determination power output values.

In a case where the condition of the power generation system is abnormal at any random time in between, the actual measurement values corresponding to the abnormal condition are included mostly the condition determination power actual measurement values but not as much in the model construction power output values. Therefore, according to the fourth embodiment, abnormality of the power generation system 14 can be detected by the processes performed by the model management unit 21, the range information management unit 22, and the condition determination unit 23.

Note that the boundary time at which the power output value separation unit 26 separates the plurality of actual measurement values is not particularly limited, but the plurality of actual measurement values are essentially separated into the actual measurement values obtained at an early measurement time and the actual measurement values obtained at a late measurement time. For example, the boundary time at which the power output value separation unit separates the actual measurement values may be configured to divide the number of provided actual measurement values into two. Alternatively, the time at which the actual measurement values between the first actual measurement value and the last actual measurement value into two time periods may be the boundary time. Also, instead of dividing the number of actual measurement values into two or in terms of time, the actual measurement values can be separated in a random ratio of 1:2, 1:3, 2:1 or the like.

A plurality of boundary times may be set and the condition determination process may be executed for each of the boundary times. In a case where the condition of the power generation system 14 is determined as abnormal at any of the boundary times, the condition of the power generation system 14 may be determined as abnormal. In a case where the boundary time is set at time that is close to the time at which abnormality actually occurs in the power generation system 14, the abnormal condition of the power generation system 14 can be detected with great accuracy by performing the condition determination process; thus, in a case where abnormality is detected in the abnormal condition in random time, it can be determined that abnormality has occurred in the power generation system 14. In such a case, it is possible to estimate that abnormality has occurred in the power generation system 14 at the time close to the boundary time, which is used to determine the condition of the power generation system 14 as abnormal.

In this case, a boundary time for separating the plurality of actual measurement values into two is set first, and then the whole actual measurement values are used as the model construction power output values or the condition determination power output values to determine the condition of the power generation system 14. In a case where abnormality is not detected in the power generation system 14, a boundary time for separating the actual measurement values of the first half into two is set, and the whole actual measurement values are used as the model construction power output values or the condition determination power output values to determine the condition of the power generation system 14. In a case where abnormality is still not detected in the power generation system 14, a boundary time for separating the actual measurement values of the last half into two parts is set, and the whole actual measurement values are used as the model construction power output values or the condition determination power output values to determine the condition of the power generation system 14. In this manner, the boundary times may be set gradually finely. In a case where the abnormal condition is detected early, such a configuration can omit the subsequent processes.

Each of the foregoing embodiments has illustrated an example in which the power generation system 14 is a photovoltaic system having a plurality of solar panels connected to each other; however, the present invention is not limited to this example. The present invention can be applied widely to various other power generation systems such as a wind generator system.

In addition, the foregoing embodiments are each an example for describing the present invention, and needless to say, are not intended to limit the scope of the present invention thereto. Those skilled in the art can implement the present invention in various other ways without departing from the gist of the present invention.

REFERENCE SIGNS LIST

11 Analysis server
12 Power conditioner
13 Sensor
14 Power generation system
15 Network
21 Model management unit
22 Range information management unit
23 Condition determination unit
24 Actual measurement value acquisition unit
25 Weather determination unit
26 Power output value separation unit
31 Pseudo system model
41 Camera

The invention claimed is:

1. A power generation system analyzer for analyzing a condition of a power generation system, comprising:
a range information management unit configured to manage a condition determination power output range corresponding to a range in which a power output at a predetermined measurement point of the power generation system is to be included with a predetermined probability or higher, the condition determination power output range being determined based on a standard deviation of a plurality of model construction power output values, which is calculated using a representative value of the power output at the measurement point and the model construction power output values, the representative value being calculated from a pseudo system model that is created with a non-parametric method using the plurality of model construction power output values, which are model construction power outputs at the measurement point;
a power output value acquisition unit configured to acquire the power output measured at the measurement point, as a condition determination power output value; and
a condition determination unit configured to compare a plurality of condition determination power output values with the condition determination power output range to determine the condition of the power generation system, based on a result of the comparison.

2. The power generation system analyzer according to claim 1, wherein the condition determination unit is configured to determine the condition of the power generation system as abnormal when a ratio of the number of condition determination power output values included in the condition determination power output range, to a total number of the condition determination power output values, falls below a predetermined threshold.

3. The power generation system analyzer according to claim 1, wherein the power generation system is configured to be a photovoltaic system having a plurality of solar panels connected to each other.

4. The power generation system analyzer according to claim 3, wherein the pseudo system model is configured to calculate, with a solar radiation amount being an input and generated power being an output, a value of the power output measured at the measurement point of the photovoltaic system.

5. The power generation system analyzer according to claim 4, wherein the pseudo system model is further configured to receive an input of a temperature of the solar panels.

6. The power generation system analyzer according to claim 5, wherein the pseudo system model is further configured to receive an input of a solar altitude of a location, where the solar panels are installed.

7. The power generation system analyzer according to claim 3, wherein
out of the plurality of model construction power output values, only model construction power output values measured when a predetermined condition is satisfied are used to determine the condition determination power output range, and
the condition determination unit uses only condition determination power output values measured when the condition is satisfied, out of the plurality of condition determination power output values, to determine the condition of the power generation system.

8. The power generation system analyzer according to claim 7, wherein
out of the plurality of model construction power output values, only model construction power output values measured in specific weather are used to determine the condition determination power output range, and
the condition determination unit uses only condition determination power output values measured in the specific weather, to determine the condition of the power generation system.

9. The power generation system analyzer according to claim 4, wherein the condition determination unit determines the condition of the power generation system by using power output values at predetermined times before and after time at which fluctuations of the inputs exceed a predetermined threshold.

10. The power generation system analyzer according to claim 3, further comprising a model management unit configured to hold a corrected pseudo system model created by performing, on a pseudo system model of a photovoltaic system different from a target photovoltaic system, correction concerning a difference in installation location and/or installation angle between solar panels of the target photovoltaic system and solar panels of the photovoltaic system.

11. The power generation system analyzer according to claim 3, further comprising a model management unit configured to hold a corrected pseudo system model created by performing, on a pseudo system model of a photovoltaic system different from a target photovoltaic system, correction concerning a difference in the number of solar panels and/or a difference in connective configuration thereof between the target photovoltaic system and the photovoltaic system.

12. The power generation system analyzer according to claim 3, further comprising a model management unit configured to hold a corrected pseudo system model created by performing, on a pseudo system model of a photovoltaic system different from a target photovoltaic system, correction concerning a difference between a time period for which the target photovoltaic system is used and a time period for which the photovoltaic system is used.

13. A method for analyzing a power generation system for analyzing a condition of the power generation system, the method comprising:

managing a condition determination power output range corresponding to a range in which a power output at a predetermined measurement point of the power generation system it to be included with a predetermined probability or higher, the condition determination power output range being determined based on a standard deviation of a plurality of model construction power output values, which is calculated using a representative value of the power output at the measurement point and the model construction power output values, the representative value being calculated from a pseudo system model that is created with a nonparametric method using the plurality of model construction power output values, which are construction power outputs at the measurement point;

acquiring the power output measured at the measurement point, as a condition determination power output value; and comparing a plurality of condition determination power output values with the condition determination power output range to determine the condition of the power generation system based on a result of the comparison.

* * * * *